Patented Dec. 19, 1922.

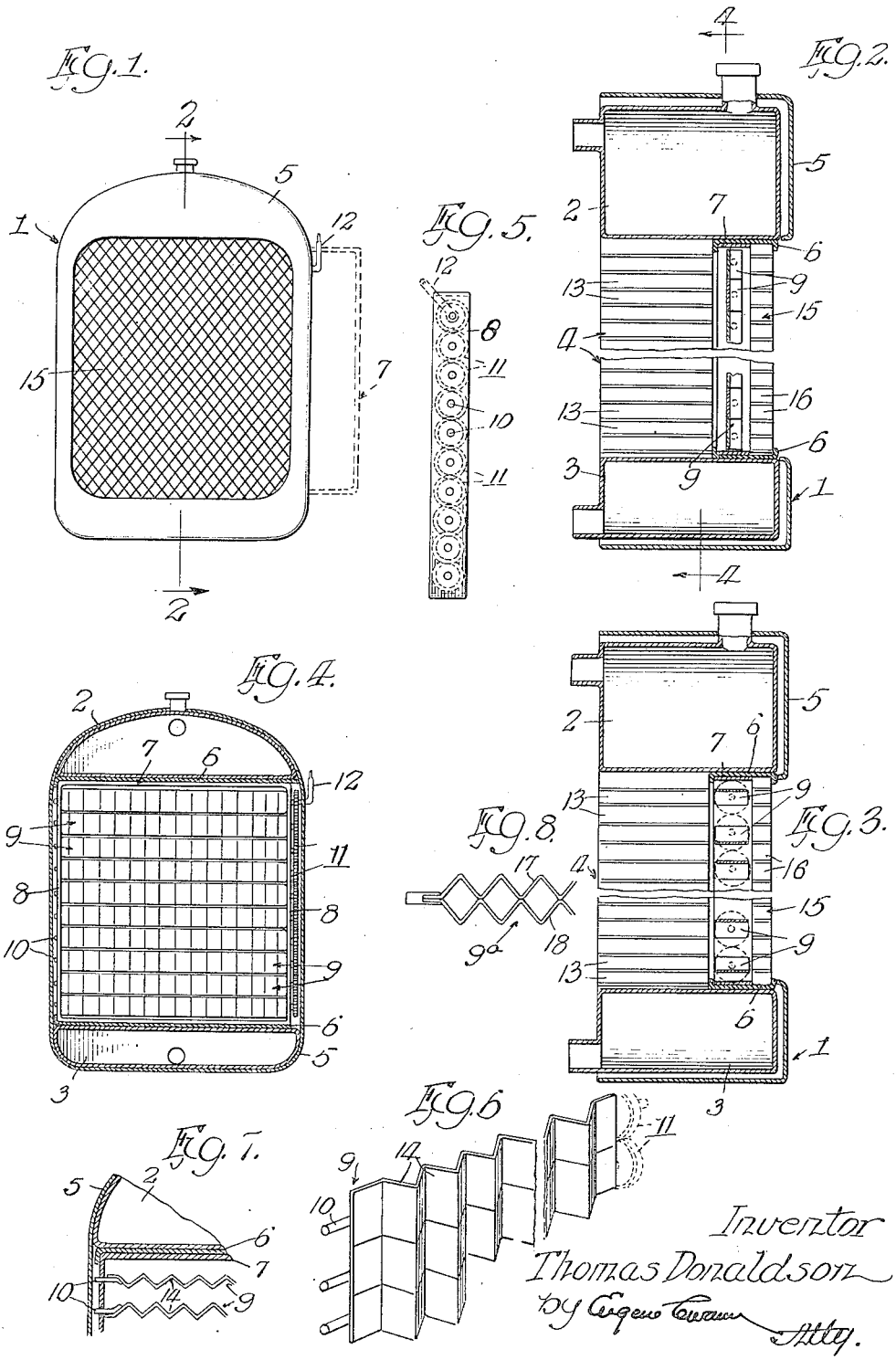

1,439,074

UNITED STATES PATENT OFFICE.

THOMAS DONALDSON, OF SUMMIT, ILLINOIS.

RADIATOR SHUTTER.

Application filed December 27, 1921. Serial No. 524,843.

*To all whom it may concern:*

Be it known that I, THOMAS DONALDSON, a subject of the King of Great Britain, residing at Summit, in the county of Cook and State of Illinois, have invented new and useful Improvements in Radiator Shutters, of which the following is a specification.

This invention relates to air controlling shutters for automobile radiators.

One object of my invention is to make the shutter a unit and slidably mount the same in front of the radiator core so that the latter may be readily reached for inspection and repair by removing the shutter mechanism, and further permit said mechanism while removed from the radiator to be readily and easily cleaned, repaired and have such other attention given it as may be needed to keep it in proper working order.

Another object of my invention is to provide in front of the shutter mechanism an apertured guard member to protect the shutter from injury by contact with exterior objects and further prevent rain and snow getting on the shutter in winter and rendering it ineffective by "freezing it up."

A further object of my invention is to provide the shutter mechanism with pivoted vanes or louvers corrugated or bent transversely throughout their lengths to conform to the shape of the air passages through the core and thus prevent said vanes when fully open hindering or interfering with a free and maximum flow of air through the core.

A still further object of my invention is to provide said guard member with perforations or air passages of the same shape and arrangement as those in the core behind the shutter so that the shutter is not noticeable and the radiator from all outward appearances looks like the ordinary radiator.

Another object of my invention is to make said guard member in the form of a "dummy" core section and have it carried by the shutter mechanism and removable therewith so that no parts extend over the front of the core when the shutter is removed to prevent free access to the core for cleaning and repair.

The invention consists further in the matters hereinafter described and more particularly set forth in the appended claims.

In the accompanying drawings—

Fig. 1 is a front elevational view of an automobile radiator equipped with a shutter mechanism mounted and constructed in accordance with my invention;

Fig. 2 is an enlarged vertical sectional view taken on line 2—2 of Fig. 1; with the vanes or louvers of the shutters fully closed;

Fig. 3 is a similar view with the vanes or louvers fully open;

Fig. 4 is a vertical sectional view taken on line 4—4 of Fig. 2;

Fig. 5 is a side view of the shutter mechanism removed from the radiator and showing the gear train employed for opening and closing the vanes or louvers;

Fig. 6 is a fragmentary perspective view of the shutter vanes in closed position;

Fig. 7 is a fragmentary front elevational view of the shutter vanes when fully open; and Fig. 8 is a view of a modified form of shutter vane or louver.

In the drawings, 1 indicates a radiator of an automobile or other motor vehicle. The radiator is of the usual type for handling cooling water and comprises, generally, upper and lower tanks 2, 3, a core 4 interposed between and opening into said tanks, and an outside casing or shell 5 surrounding said tanks and core and containing the same. As illustrated, the core 4 is of the honeycomb or cellular type, although any other type may be used.

For controlling the passage of air through the core 4, I provide a shutter mechanism constructed as follows.

The tanks 2 and 3 both extend forward beyond the core 4, as shown in Figs. 2 and 3, and secured to said tanks in front of the core are channel members 6, 6. The former is secured to the under side of the top tank 2 and the latter to the upper side of the bottom tank 3, as shown. These channel members 6, 6 extend the full width of the core and are opposite each other to provide a channel-way for the frame of the shutter mechanism, this channel-way opening through the sides of the radiator, as shown in Fig. 4.

The frame of the shutter mechanism comprises top and bottom members 7, 7 connected by vertical side members 8, 8. The former are slidably received in the channel members 6, 6, and extending between the side members 8, 8 are a plurality of pivoted vanes or louvers 9, 9. These have at their ends trunnions 10, 10 extending through and journaled in the side members 8, 8, as shown.

For opening and closing the vanes or louvers 9, 9, any suitable form of mechanism may be employed, but in the drawings I have shown intermeshing gear pinions 11, 11 for this purpose. Said gears are arranged at one side of the frame, outside the side members 8, and there is one gear fixed on each trunnion 10 at such side of the frame. For actuating the gear train, one of the trunnions 10, preferably the uppermost one, is provided with an arm 12. This may be connected with a thermostatic device (not shown) in case the operation of the shutter is to be automatic, or to a suitable pull rod running to the dash of the car when the operation is to be under manual control.

As clearly shown in Figs. 6 and 7, the vanes or louvers 9, 9 are corrugated or bent transversely throughout their lengths to conform when open to the cross-sectional shape of the air passages 13, 13 through the core 4. This, as shown, is cellular, and thus the air passages 13, 13 are tubular, substantially horizontal, and extend from front to back of the core. In cross-section these air passages are somewhat diamond shape. The vanes 9, 9 are thus bent to have a plurality of connected, inclined or V-shaped sections 14, 14, so that when the vanes are fully open, they line up with the walls of the air passages 13, 13 and do not extend over them to in any way hinder or interfere with the free flow of air through the core 4. Manifestly, when the shutter is fully open, a maximum flow of air is had through the core 4, and its cooling function is in no way impaired or reduced by having the shutter mechanism associated with it. In Figs. 2, 4, and 6, I have shown the vanes 9, 9 fully closed, while in Figs. 3 and 7 the vanes are fully open. When partially open the amount of air passing through the core 4 is of course controlled.

Arranged in front of the vanes 9, 9 is a guard member 15. This, as shown in the drawings, has the form of a section of the core 4. That is, said member 15 is made cellular in form and has air passages 16, 16 of the same shape and arrangement as in the core 4 behind the shutter mechanism. The member 15 is secured to the shutter frame in any preferred manner, as by soldering, and has no water connection with either of the radiator tanks 2, 3. Thus, said member constitutes a "dummy" core section and being carried by the shutter frame is removable therewith from the radiator. Said member 15 serves several purposes: it protects the shutter mechanism from injury when in the radiator and conceals the shutter from view, and further gives the radiator from all outward appearances the same appearance as an ordinary radiator.

After the shell 5 has been removed, the shutter mechanism can be removed from the core by sliding the frame through one side of the channel-way provided by the channel members 6, 6. This takes the shutter mechanism from in front of the core and allows free access to the front of the same for cleaning and repair. The guard 15 is carried by the frame in its removal and thus is out of the way for access to the core 4.

The guard 15, when the shutter mechanism is in place in front of the core 4, not only protects said mechanism from injury, but also prevents rain and snow getting on the vanes and associated parts in winter to freeze them up and render the shutter ineffective.

In Fig. 8, I have shown a modified form of vane or louver. This is indicated for reference by 9$^a$, and is made double. That is, it has connected top and bottom walls 17, 18. These are bent or corrugated transversely, the same as the single walled vanes 9 and for the same purpose.

While I have shown and described herein in detail an air controlling shutter embodying the features of my invention, it is of course to be understood that the details of construction and arrangement of parts illustrated may be variously changed and modified without departing from the spirit and scope of my invention.

I claim as my invention:

1. The combination with an automobile radiator having a core, of channel members fixed in front of said core, and a shutter mechanism including a frame slidably mounted in said channel members and removable therefrom.

2. The combination with an automobile radiator having a core, of channel members fixed in front of said core, a shutter mechanism including a frame slidably mounted in said channel members and removable therefrom, and a perforated guard member in front of said shutter mechanism.

3. The combination with an automobile radiator having a core, of channel members fixed in front of said core, a shutter mechanism including a frame slidably mounted in said channel members and removable therefrom, and a perforated guard member in front of said shutter mechanism and carried by said frame.

4. The combination with an automobile radiator having top and bottom tanks and a core therebetween, of channel members secured to said tanks in front of said core, and a shutter mechanism including a frame slidably mounted in said channel members and removable therefrom.

5. The combination with an automobile radiator having top and bottom tanks and a core therebetween, of channel members secured to said tanks in front of said core, a shutter mechanism including a frame slidably mounted in said channel members and removable therefrom, and a perforated guard member in front of said shutter mechanism and carried by said frame.

6. The combination with an automobile radiator having a core, of an air controlling shutter mechanism for said core, means removably mounting said shutter mechanism in front of said core, and a perforated guard member in front of said shutter mechanism, said guard member having its perforations shaped and arranged similar to the air passages in said core.

7. The combination with an automobile radiator having a core, of channel members fixed in front of said core, a shutter mechanism including a frame slidably mounted in said channel members and removable therefrom, and a perforated guard member in front of said shutter mechanism and carried by said frame, said guard member being in the form of a dummy core section.

8. The combination with an automobile radiator having a core with substantially horizontal tubular air passages therethrough, of an air controlling shutter mechanism for said core, said shutter mechanism having a plurality of movable vanes bent transversely to conform to the shape of the air passages through said core, and means for opening and closing said vanes.

9. The combination with an automobile radiator having a core with substantially horizontal tubular air passages therethrough, of an air controlling shutter mechanism for said core, said shutter mechanism having a plurality of movable vanes bent transversely to conform to the shape of the air passages through said core, means for opening and closing said vanes, and means removably mounting said shutter mechanism in place in connection with said core.

10. An air controlling shutter for automobile radiators, comprising a frame, a plurality of vanes pivotally mounted in said frame, said vanes being corrugated or bent transversely throughout their lengths, and means for opening and closing said vanes.

11. An air controlling shutter for automobile radiators, comprising a frame, a plurality of vanes pivotally mounted in said frame, said vanes being corrugated or bent transversely throughout their lengths, and a gear train for opening and closing said vanes.

12. An air controlling shutter for automobile radiators, comprising a frame, a plurality of vanes pivotally mounted in said frame, said vanes being corrugated or bent transversely throughout their lengths, intermeshing gears on said vanes, and means for actuating said gears.

13. The combination with an automobile radiator having top and bottom tanks with a core therebetween and an outer casing or shell surrounding said core and tanks, of an air controlling shutter mechanism for said core, said shutter mechanism including a frame slidably mounted between said tanks in front of said core, said shell having a vertical opening in one of its side walls to permit sliding said shutter mechanism into and out of place in front of said core.

In testimony that I claim the foregoing as my invention, I affix my signature this 22d day of December, A. D. 1921.

THOMAS DONALDSON.